Patented Feb. 9, 1943

2,310,341

UNITED STATES PATENT OFFICE 2,310,341

RUSTLESS IRON

William Bell Arness, Bellevue, Pa., assignor to Rustless Iron and Steel Corporation, a corporation of Delaware No Drawing. Original application June 20, 1938, Serial No. 214,813. Divided and this application January 27, 1941, Serial No. 376,197

3 Claims. (Cl. 219—8)

This application is a division of my copending application Serial No. 214,813, which in turn is a division of my U. S. Patent #2,121,001 issued June 21, 1938, and entitled Rustless iron, and the invention relates to an alloy iron and to corrosion-resistant products or articles of manufacture of the same.

Among the objects of my invention is the provision of plates, sheets, wires, strips, bars and tubes, as well as special shapes, corrugated sheet, welded pipe which are strong, tough and durable; which are resistant to the progressive corrosion under the various conditions encountered in actual, practical use with a minimum of special preparation of a corrosion-resisting surface, as by special heat-treatment, working or finishing; which readily lend themselves to cutting, drilling, punching, reaming, threading and the like; which may be riveted, welded, or otherwise fabricated into a variety of articles, structures, appliances or pieces of equipment.

Other objects will be obvious in part and in part pointed out hereinafter.

The invention accordingly consists in the combination of elements, mixture of materials and composition of ingredients; in the features of construction and arrangement of parts; and in the several steps and the relations of each of the same to one or more of the others as described herein, the scope of the application of which is indicated in the following claims.

As conducive to a clearer understanding of certain features of my invention it may be noted at this point that certain mining, chemical, oil, transportation and dairy equipment in use today is fabricated of known rustless irons and steels of the high chromium and high chromium-high nickel varieties in the form of plates, sheets, strips, bars and rods, hot-rolled, cold-rolled, heat-treated and polished to present a surface resistant to corrosion under the conditions encountered in actual use.

The high-chromium rustless irons and steels in the form of hot-rolled and cold-rolled plate, sheet, strip, bars, rods and the like are strong and durable. While these products may be cut, drilled, bent and otherwise shaped for fabrication and may be bolted, riveted or welded in the production of desired apparatus or equipment, their working characteristics are not especially good. As compared with the low-carbon irons and steels the metal is formed or shaped with difficulty, the machining characteristics are not so good and the welding characteristics are rather poor.

The high chromium-high nickel irons or steels, of which the 18–8 chromium-nickel iron or steel is characteristic, in the form of cold-rolled plate, sheet and strip and in the form of cold-worked bars, rods and wire are possessed of many highly desirable characteristics. These products are strong, tough and ductile and may be readily formed as by deep-drawing, spinning and beading into desired shapes. As compared with the low-carbon irons and steels, however, these products lend themselves to machining with difficulty and are welded only with the exercise of great care; where usual welding methods are employed a stabilizing heat-treatment of the article, structure or piece of equipment is frequently essential to the life of the metal.

These irons and steels are not in general and wide-spread use, first, because of the great cost of the metal itself; then because of the high cost of converting these irons and steels from ingots to plates, sheets, strips, bars, rods, wires and tubes; the high cost of heat-treating and finishing the products; the comparatively great cost of forming and fabricating desired structures or equipment from the products; and the great cost of finally giving these fabricated structures a desired heat-treatment and finishing treatment.

Among the outstanding objects of my invention is the provision of inexpensive alloy iron plate, sheet, strip, bars, rods, wire, special shapes and tubes which are readily worked or formed to desired size and shape and which are easily and inexpensively fabricated by bolting, riveting, or welding into a variety of structures, pieces of equipment or mechanical parts; which are light in weight; which are strong, tough and durable; which are substantially incorrodible under various conditions of climatic and temperature change; which are resistant to impact, vibration and the like encountered in actual, practical use.

In accordance with the practice of my invention a heat of alloy iron analyzing approximately 9% to 13% chromium, preferably 11% to 12% chromium, .02% to .07% carbon, .005% to .035% nitrogen, with the usual percentages of nickel, manganese silicon, sulphur and phosphorus and the balance substantially iron, is produced, for example, in a manner particularly described in my recently granted U. S. Patent 1,954,400 entitled Process of making rustless iron. While a carbon content of .07% and a nitrogen content of .035% is permissible, it is decidedly preferable to conduct the melting operation so as to achieve as low a content of these ingredients as is commercially feasible. The presence of carbon and nitrogen in the metal is not desired; it is commercially unavoidable. Where such low values are reached, however, there is very little objection to their presence. Ordinarily the carbon content in the finished metal amounts to about .05% and the nitrogen content about .025%, the total contents of the carbon and nitrogen then amounting to about .075%.

The heat of metal is teemed into ingot molds where it is permitted to solidify and cool, after which the molds are stripped from the formed ingots. These ingots are soaked at a desired temperature for a suitable period of time and are then rolled, forged or pressed into tube rounds, billets, slabs, blooms, sheet bar or hot-strip. The partially converted products are reheated and further hot and/or cold-worked as in the production of seamless tubes, rods, and strip.

The plate, sheet, strip, bars, rods, wire, special shapes and tubes are strong, tough and durable. They may be sheared, punched, drilled, threaded or otherwise machined. They lend themselves to ready forming as by bending and pressing into a number of special structural shapes. Because of their restricted hardening characteristics they lend themselves to a certain ease in welding, as in the fabrication of desired structures, articles of commerce and pieces of industrial equipment, all as more particularly pointed out hereinafter.

My alloy iron products are particularly adapted to the fabrication of outdoor structures such as buildings, bridges, towers, fences and the like where the structures are exposed in whole or in part to changing weather conditions. Likewise, they are well adapted to the production of railway, mining and excavating equipment such as containers, bins, coal-washing equipment, buckets, machinery parts and hoists. They are well suited to the fabrication of riveted or welded conduits, tanks, bins, hoppers, vats and the like as employed in various chemical, canning and photographic film industries where mildly corrosive liquids, vapor and gases such as nitric acid, ferric sulphate, fruit and vegetable juices, mine waters, soap solutions and photographic developing solutions are handled.

These alloy iron plates, sheets, strip, bars, rods, wires and tubes are especially useful in marine duty where lightness in weight coupled with strength and corrosion resistance are required. The tubes and plate and sheet fabricated into riveted or welded pipes are particularly suitable for surface and sub-surface pipe-lines and culverts, as used in the piping of gas, oil and other corrosion-fostering agents. The bars and rods are useful in the production of sucker rods, pumping equipment, stays and machine parts used in the sour oil fields.

Where my various alloy iron products are to be welded, as in the fabrication of desired structures, pieces of equipment, or parts of apparatus of the character indicated, certain definite advantages are gained by including in the analysis of the metal one or both of the ingredients nickel and manganese, as appears more fully hereinafter. Good results are achieved where the nickel content amounts to from about .4% up to about 3% with manganese present in usual amounts or where the manganese is present in the amount of from about .4% up to about 3% with nickel present in usual amounts. Best results are achieved, however, where the total amounts of the nickel and manganese contents is at least as much as .8% and preferably as much as 1.0%. Ordinarily both nickel and manganese are included in the analysis of the metal in more than the amounts usually encountered, the sum of these ingredients preferably ranging between .8% and 5%, my alloy iron and the various products of the same preferably analyzing then, approximately 9% to 13% chromium, .4% to 3% nickel, .4% to 3% manganese, .005% to .035% nitrogen, .02% to .07% carbon and the balance of the metal substantially all iron.

In the fabrication of a welded structure, article or piece of equipment, electric welding methods are preferably employed, although a good weld is made by means of the oxy-acetylene torch. A welding rod or welding electrode of alloy iron having a chromium content somewhat higher than that of the product welded is used to compensate for the chromium content lost through oxidation during the welding operation. The carbon content of the welding rod is as low as practicable in order to avoid hardening of the weld metal in cooling. In order to assure a dense weld and one that is free from localized corrosion a small amount of molybdenum is preferably included in the analysis. For example, the welding rod employed analyzes approximately, 8% to 15% chromium, .3% to 3% molybdenum, .02% to .07% carbon with the balance substantially all iron.

The weld bead is strengthened and rendered tough without undue hardening in cooling by including in the analysis of the welding rod the further ingredient nickel in the amount of about .3% to 3%. This addition furthermore results in a fine grain structure, gives a ductile weld and in a measure improves the resistance of the weld to certain corrosive agents. Similarly, certain desirable results are realized by including in the analysis about .3% to 3% of manganese. This ingredient appears to give a cleaner and more fluid weld, directly facilitating the welding operation, and furthermore toughens and strengthens the weld as does the nickel addition. Best results are achieved where molybdenum, nickel and manganese are all present in the approximate amounts indicated.

Good results in electric and oxy-acetylene welding also are achieved where a welding rod of an austenitic chromium-nickel iron or steel is employed. For example, in welding products of the character indicated good results are produced employing a rod analyzing approximately 18% chromium, 8% nickel, .07% carbon and the balance substantially iron. The bead of weld metal is soft, fine grained in character and is not brittle.

A soft ductile weld free of grain growth and embrittlement is assured by carefully conducting the welding operation in accordance with known methods so as to minimize the taking up of nitrogen by the weld metal. The presence of an appreciable nitrogen content in the weld bead and the metal adjoining the bead serves to harden the metal as it solidifies and cools just as does the presence of an appreciable amount of carbon. By skillful operation of electric arc welding equipment or oxy-acetylene welding equipment nitrogen contamination of the weld is largely avoided.

Immediately adjacent the weld bead there is a zone of metal which has been raised to a temperature above the critical point of the alloy iron and is therefore mildly hardened in cooling. This hardening, however, is limited by the structural sluggishness of the metal resulting from the addition of nickel and manganese.

Back from the zone of metal immediately adjacent to the weld there is a zone of metal which has reached a temperature just under the critical point. This zone of metal in cooling is softened somewhat, the softening action being limited, however, by the structural sluggishness of the metal introduced by the presence of nickel and manganese.

After the welding operation is complete in the fabrication of a desired structure, piece of apparatus or piece of equipment, the fabricated structure as desired may be uniformly reheated in a suitable furnace to a temperature of between 900° to 1400° F., and then permitted to cool. This tempering treatment relieves the internal stresses introduced as a result of the welding operation and softens both the weld bead and the zones of metal adjoining the weld.

Where the fabricated structure is of such size or for other reasons a complete reheating of the structure is impractical, a satisfactory stress-relieving treatment is achieved by locally reheating the actual weld and the zones adjacent the weld by means of a torch. By skillful handling of the torch these regions are brought up to a fairly uniform temperature just beneath the critical point and held at this value sufficiently long to establish a uniform condition in the metal and relieve local stresses and hardness. The structure is then permitted to cool and the weld ground, or otherwise finished off, in accordance with known methods. In many instances the weld retains sufficient toughness and ductility, largely as a result of the nickel and without benefit of a stress-relieving treatment. In applications where stress-relieving heat-treatment is impracticable, metal, including about 1% or more each of nickel and manganese, is recommended.

While my alloy iron, plate, sheet, strip, bars, rods, wire, special shapes and tubes represent an excellent balance between a desired low manufacturing cost and high physical characteristics, such as strength, hardness, toughness, ductility, impact resistance and corrosion-resistance, coupled with good working, forming and welding properties, certain highly beneficial results are achieved by including in the analysis of the metal the ingredient molybdenum in the amount of from about .3% to 3%.

The presence of molybdenum in the amount of about .3% or more imparts improved corrosion-resisting characteristics to the hot-worked plate, sheet, strip, special shapes, bars, rods, wire and tubes in that this addition reduces the susceptibility of these products to a peculiar type of local corrosive attack known as pitting. The molybdenum addition is particularly desirable in products intended for marine duty where the corrosive attack of salt water and salt spray is encountered. In addition, molybdenum in the amount indicated is advantageous in lending a certain solidity or soundness to the structure of the metal in which it is included.

Certain other advantages such as increase in strength and a reduction in hardening, are obtained by including in the analysis of my alloy iron a small amount of silicon. Good results are ordinarily achieved where the metal includes silicon in the amount of from about .5% to 2% or more. This ingredient is particularly beneficial in improving the heat-resistance characteristics of my alloy iron products.

An alloy iron, and hot-worked plate, sheet, strip, bars, rods, wire and tubes of the same, including both copper and silicon, possesses a very good balance of desired physical characteristics, corrosion and heat resistance, good working qualities and good forming and welding properties. In a measure, the presence of copper limits the embrittling tendency of the silicon and the presence of the silicon permits good hot and cold-working characteristics of the copper-containing metal.

Thus, it will be seen that there has been provided in this invention comparatively inexpensive alloy iron plates, sheet, strip, bars, rods, wire, tubes and the like, which lend themselves to ready fabrication either by riveting or welding into a wide variety of structures which are well adapted to withstand the various conditions of physical strain and corrosion encountered in actual, practical use with a minimum of attention, replacement or repair.

As many possible embodiments may be made of my invention, and as many changes may be made in the embodiments hereinbefore set forth, it will be understood that all matter desscribed herein is to be interpreted as illustrative and not in a limiting sense.

I claim:

1. In articles of manufacture of the class described, a welding rod particularly adapted to give a tough, ductile and corrosion-resisting weld which is free from substantial air-hardening, said rod analyzing approximately 8 per cent to 15 per cent chromium, .3 per cent to 3 per cent manganese, .3 per cent to 3 per cent nickel, .3 per cent to 3 per cent molybdenum, .02 per cent to .07 per cent carbon and the balance substantially iron.

2. In manufactures of the class described, a strong, tough and ductile corrosion-resisting weld free from substantial air-hardening, said weld analyzing approximately, 8 per cent to 15 per cent chromium, .3 per cent to 3 per cent manganese, .3 per cent to 3 per cent nickel, .3 per cent to 3 per cent molybdenum, .02 per cent to .07 per cent carbon and the balance substantially iron.

3. In manufactures of the class described, a welded product which is strong, tough, ductile, and substantially free from air-hardening at and adjacent the weld, which product at and adjacent the weld comprises approximately 8 per cent to 15 per cent chromium, .3 per cent to 3 per cent manganese, .3 per cent to 3 per cent nickel, .3 per cent to 3 per cent molybdenum, .02 per cent to .07 per cent carbon and the balance iron.

WILLIAM BELL ARNESS.